United States Patent
Godbole et al.

(10) Patent No.: US 12,294,531 B2
(45) Date of Patent: May 6, 2025

(54) INTELLIGENT AUTO-SCALING OF COMPONENTS PROVIDING DATA PROTECTION SERVICES WITHIN A CLUSTERED ENVIRONMENT

(71) Applicant: Dell Products L.P., Round Rock, TX (US)

(72) Inventors: Ajey Godbole, Pune (IN); Poornima Gupte, Pune (IN)

(73) Assignee: Dell Products L.P., Round Rock, TX (US)

( * ) Notice: Subject to any disclaimer, the term of this patent is extended or adjusted under 35 U.S.C. 154(b) by 32 days.

(21) Appl. No.: 18/188,660

(22) Filed: Mar. 23, 2023

(65) Prior Publication Data

US 2024/0323143 A1    Sep. 26, 2024

(51) Int. Cl.
| | |
|---|---|
| *G06F 15/173* | (2006.01) |
| *H04L 47/762* | (2022.01) |
| *H04L 47/80* | (2022.01) |
| *H04L 47/83* | (2022.01) |

(52) U.S. Cl.
CPC .......... *H04L 47/808* (2013.01); *H04L 47/762* (2013.01); *H04L 47/83* (2022.05)

(58) Field of Classification Search
CPC ... H04L 47/808; H04L 47/762; H04L 47/823; H04L 47/83

USPC ......................................................... 709/226
See application file for complete search history.

(56) References Cited

U.S. PATENT DOCUMENTS

| | | | |
|---|---|---|---|
| 7,320,131 B1 * | 1/2008 | O'Toole, Jr. ............ | G06F 9/505 |
| | | | 709/224 |
| 10,880,388 B1 * | 12/2020 | Huber ...................... | H04L 67/60 |
| 2005/0005012 A1 * | 1/2005 | Odhner ................... | G06Q 10/06 |
| | | | 709/226 |
| 2019/0386889 A1 * | 12/2019 | Noorshams ............. | H04L 47/70 |
| 2020/0076715 A1 * | 3/2020 | Kondapalli ............ | H04L 43/024 |
| 2023/0318988 A1 * | 10/2023 | Wang ..................... | H04L 47/801 |
| | | | 709/226 |

* cited by examiner

*Primary Examiner* — Imad Hussain
(74) *Attorney, Agent, or Firm* — Dergosits & Noah LLP; Todd A. Noah (57) ABSTRACT

Methods (and systems) described herein provide a specialized technique for automatically scaling resources that provide data protection services to client systems. In some embodiments, the resource units (or pods) may be deployed on a platform (e.g., platform-as-a-service, or PaaS), which provides containerized services (and workloads) as part of a clustered computing environment (e.g., Kubernetes). The technique may scale the number of resource units used to perform data protection operations based on specialized criteria. For example, a particular service (e.g., redirection service) that utilizes resource units (e.g., pods) to perform functions may automatically increase (or decrease) the number resource units available to handle data management operations originating from the client systems.

20 Claims, 4 Drawing Sheets

INTELLIGENT AUTO-SCALING OF COMPONENTS PROVIDING DATA PROTECTION SERVICES WITHIN A CLUSTERED ENVIRONMENT

TECHNICAL FIELD

This disclosure relates to managing resources for data protection systems, and more particularly, automatically scaling resource units that provide data protection services within a clustered computing environment.

BACKGROUND

Data protection systems may provide various tools that are crucial for enterprise level network clients. For example, clients may rely on such systems to efficiently back up and recover data in the event of user error, data loss, system outages, hardware failure, or other catastrophic events to allow business applications to remain in service or quickly come back up to service. As part of providing such data protection systems, providers may leverage various types of computing environments. For example, data protection providers may provide tools and services that may be deployed within clustered computing environments, which are often provided as part of an on-demand platform (e.g. platform-as-a-service). These platforms provide several advantages including the ability to customize the amount of computing resources required by applications. To manage computing resources, these platforms may provide various built-in tools. However, these tools may be limited and only manage resources for current demand, which may be less than ideal especially when dealing with critical data protection services. Accordingly, there is a continued need to provide intelligent techniques to proactively scale computing resources for data protection services within a clustered environment.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

The methods (and systems) of the embodiments described herein provide a specialized technique for automatically scaling resources that provide data protection services to client systems. In particular, in some embodiments, the resource units (or pods) may be deployed on a platform (e.g., platform-as-a-service, or PaaS), which provides containerized services (and workloads) as part of a clustered computing environment (e.g., Kubernetes). The technique may scale the number of resource units used to perform data protection operations based on specialized criteria. For example, a particular service (e.g., redirection service) that utilizes resource units (e.g., pods) to perform functions may automatically increase (or decrease) the number resource units available to handle data management operations originating from the client systems.

When determining whether to scale the number of resource units, the methods (and systems) may utilize a combination of specialized criteria. This criteria may include the current workload (e.g. the number of resources units currently deployed) and resource utilization rate related to the current workload such as the amount of CPU, memory, network usage, etc. associated with the deployed resources units. In addition, the criteria may include historical workload and resource usage information. For example, the historical workload information may include previous workloads during previous similar time periods (e.g., day of week/time of day) as well a resource utilization rate (e.g., CPU usage, memory usage, etc.). The historical information may also include scaling history such as previous scaling occurrences required in the past during similar time periods. Accordingly, the methods (and systems) described herein may dynamically evaluate various criteria to anticipate potential workloads and proactively deploy sufficient resources to ensure the efficient functioning of critical data protection services.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g., Solid State Drive (SSD), Hard Disk Drive (HDD)), which may include virtual storage systems provided by a cloud service provider.

Figure 1:
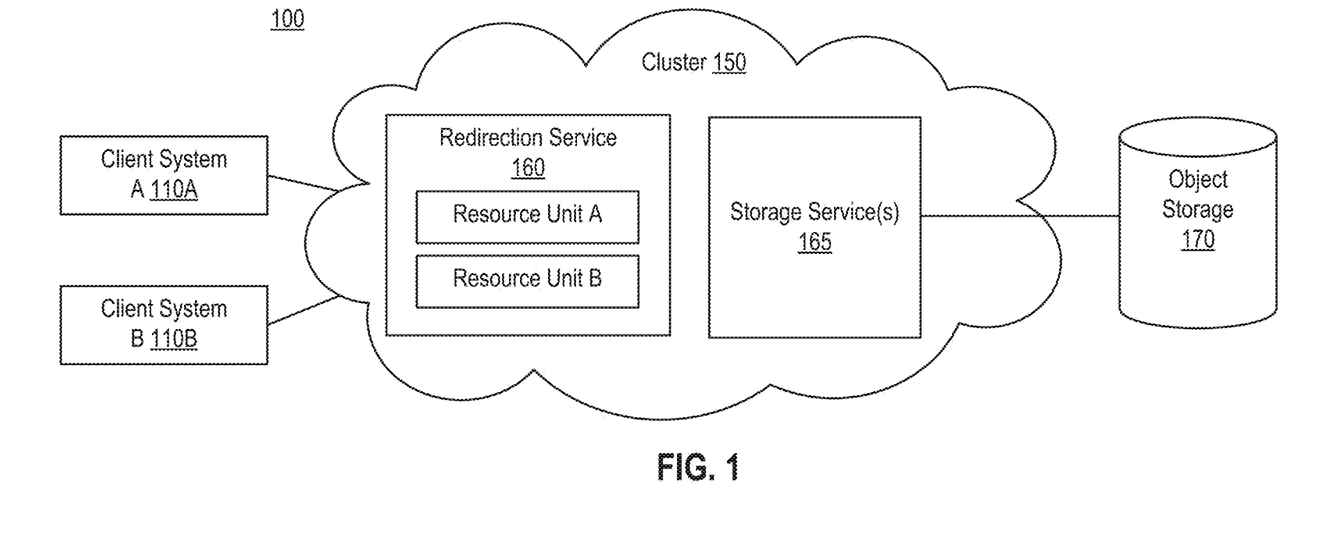
FIG. 1 is a block diagram illustrating an example operating environment that may be used in conjunction with one or more embodiments of the disclosure.

More specifically, and with reference to FIG. 1, shown is a block diagram illustrating an example of an operating environment 100 that may be used in conjunction with one or more embodiments of the disclosure. Components of operating environment 100 may interact via a network, which may be any type of wired or wireless network including a local area network (LAN), a wide area network (WAN), or a direct communication link, or other suitable connection.

As shown, the environment 100 may include one or more client system(s) 110 (shown as client system A 110A and client system B 110B) that may connect (or communicate) with a computing cluster (or cluster) 150. The management of data as further described herein may be provided by one or more services including a redirection service 160 and a storage service(s) 165. This data may be stored as part of an object storage 170. In general, environment 100 may provide a system that provides the ability for client system 110 (e.g., Dell EMC DDBoost client) to manage data (e.g., backup and recovery data) stored on the object storage 170. To manage the requests and handle the workloads provided by the client system 110, the data protection service (or platform) may deploy services (and applications) as part of cluster 150. In some embodiments, cluster 150 may be provided by a third-party as part of a platform. The platform may provide containerization of applications and services. In some embodiments, the platform may be based on Kubernetes, although the use of any suitable platform is contemplated. As part of a containerization platform, services (e.g., redirection service 160) may be provided by one or more resource units (or pods) shown as resource unit A and resource unit B. These resource units (or pods) may form one or more containers. In general, containers may provide a form of operating system virtualization that allows the execution of services in a resource-isolated manner. Although not shown, it should be noted that the resource units may be hosted on one or more nodes that form the cluster. It should be noted that although some components described herein may be referred to using terminology (e.g., "pods") specific to a particular platform (e.g., Kubernetes), these components are to be interpreted generally such that the methods and systems described herein may be applied to other types of platforms as known to a person skilled in the art.

Referring again to the redirection service 160, in operation, it may perform file system redirection and act as a proxy. In particular, redirection service 160 may function as an entry point to cluster 150 (e.g., entry point for a data path). For example, to commence data operations, the client system 110 may connect with the redirection service 160 to obtain the address of storage service 165. Storage service 165 may include on or more services that perform data storage operations as part of the overall data protection service. For example, the storage service 165 may include a first service (e.g., access object service) that manages the distributed namespace, Mtrees, and related files. It may also route data to additional services such as a second service (e.g., deduplication object service) that performs deduplication and compression of data before storing the data to the object storage 170. Accordingly, the coordination between these services provides the ability for client system 110 to protect their data on the object storage 170. However, since the number of client system 110 requests to the cluster 150 may increase rapidly, it requires intelligent management of resource unit deployment (e.g., auto-scaling) to ensure that the critical data protection operations run smoothly. Such intelligent scaling is further described with reference to FIG. 2.

Figure 2:
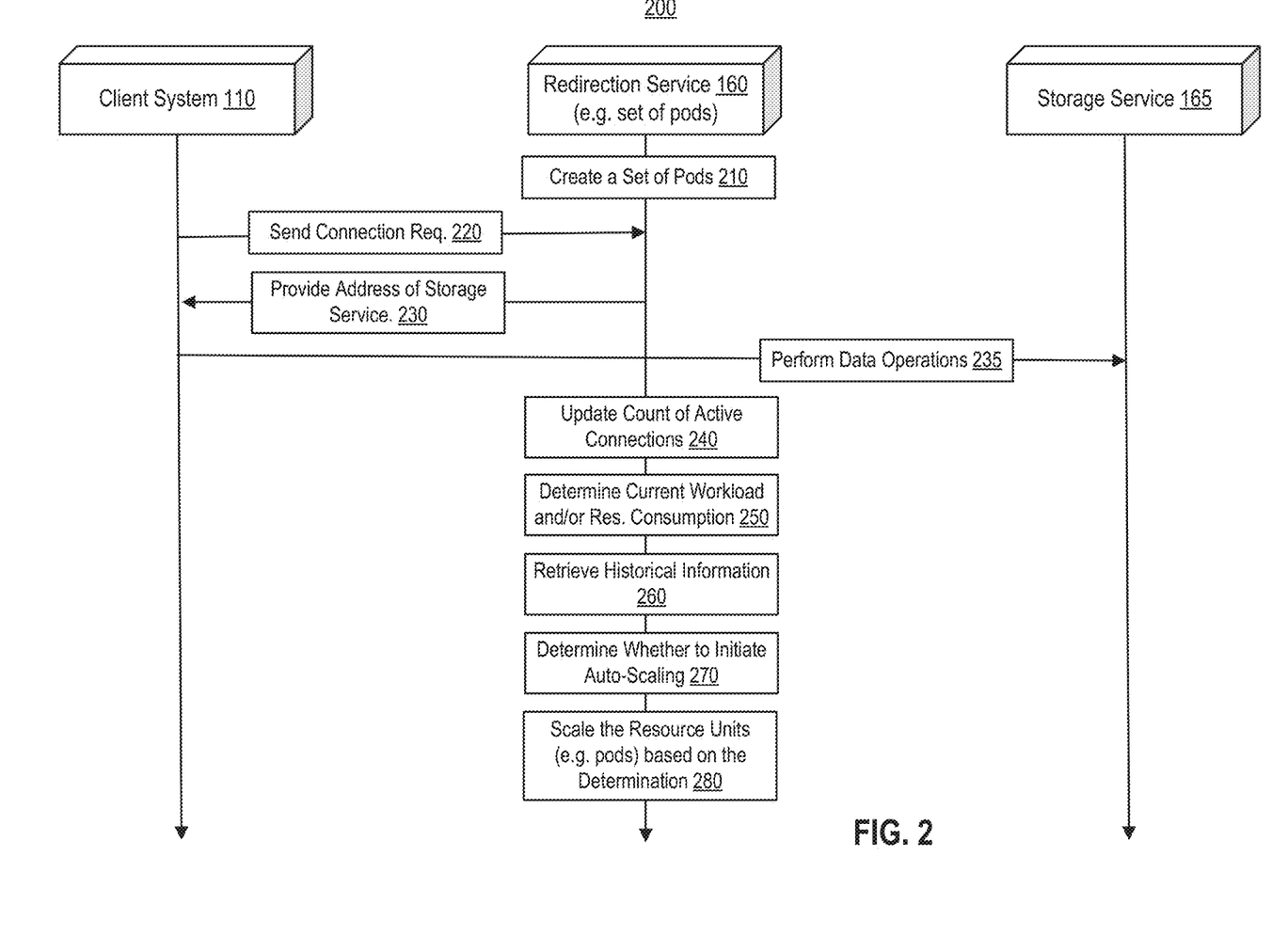
FIG. 2 is a process flow diagram illustrating an example process flow for automatically scaling resources for data protection services according to one or more embodiments of the disclosure.

FIG. 2 is a process flow diagram illustrating an example process flow for automatically scaling resources for data protection services according to one or more embodiments of the disclosure. Process 200 may use processing logic, which may include software, hardware, or a combination thereof. For example, process 200 may be performed by a system including one or more components described in operating environment 100.

A client system (or client) 110 may interact with the cluster (e.g., cluster 150) to manage data stored on an object storage (e.g., object storage 170). The client 110 may access the cluster by interacting with one or more services including a redirection service 160 and a storage service 165. It should be noted that although the storage service 165 is shown as a single component, it may represent multiple storage services.

As shown, in 210, the redirection service 160 may initiate the creation of a set of pods (or resource units) that execute (or run) the redirection service 160 within the cluster. The redirection service 160 may provide a single address (e.g., IP address) to which clients 110 may connect.

Accordingly, in 220, the client 110 may send a connection request to the redirection service 160 that includes a request to perform data operations (e.g., read/write operations) for data stored on the object storage. In 230, as a response to the connection request, the redirection service 160 may accept the request including providing an address (e.g., IP address) of the storage service 165 that manages the storage of data on the object storage 170. Once the client 110 is connected to the cluster, the client 110 may send data operation instructions to the storage service 165, which then performs such operations on data stored on the object storage in 235.

In 240, the redirection service 160 may update a count of active connections by clients to the cluster in response to the accepted connection in step 230. This count of active connections may be maintained in a memory. The memory may include a persistent storage accessed by one or more pods of the redirection service, or may include a memory (e.g., cache) maintained by each pod of the redirection service.

As part of managing connection requests, the system (or an individual pod) may perform a specialized process for automatically scaling (i.e., auto-scaling) the resource units (e.g. pods) of the redirection service 160 based on a combination of criteria including, but not limited to, current, and historical, workload and resource consumption associated with providing the redirection service 160. More specifically, in 250, the system (or individual pod) may determine a current workload and/or resource consumption associated with the redirection service 160. To determine the current workload of the redirection service 160, the system (or individual pod) may determine the active number of client connections to the redirection service 160. For example, the system (or individual pod) may retrieve the count of active connections and determine whether the count exceeds a predetermined threshold. If so, the individual pod may initiate the creation of one or more additional pods as further described herein. Similarly, if the count of active connections falls below a threshold, the number of pods may be reduced.

In addition, the system (or individual pod) may determine the resources consumed by the active connections. For example, the resources may include a combination of CPU, memory, network bandwidth, and other resources associated with particular pods (or associated nodes), and/or all of the pods (or associated nodes) providing the redirection service 160. For instance, an individual pod may determine whether the CPU or memory usage of the pod (or associated node) required to maintain the currently active connections to clients exceeds a predetermined threshold. If so, the individual pod may initiate the creation of one or more additional pods as further described herein.

In 260, the system may also retrieve historical information associated with the redirection service. The historical information may include previous workloads and resource consumption for the redirection service, and information regarding previous occurrences of automatic scaling of resource units (e.g., pods). This historical information may correspond to a similar time period as the time for which the connection request (e.g., step in 230) was received. For example, if the connection request was received at 11 pm on a Friday (e.g., preferred time to perform weekly backup services by the client), the historical information would correspond to previous workloads during similar time periods. The historical information retrieved may include one or more of the number of active connections, the resource consumption of particular and/or all pods, and the degree to which automatic scaling was initiated in the past (e.g., the additional number of pods that were created from auto-scaling during similar time periods in the past). The historical information may be stored in a persistent storage and/or stored in a memory (e.g., cache) maintained by each pod of the redirection service.

In 270, the system (or individual pod) may determine whether to initiate automatic scaling based on a combination of the workload and/or resource consumption determined in step 250, and the historical information retrieved in step 260. Based on this combination of information, the system may determine (or predict) resource unit requirement (e.g., number of pods required) to meet current and/or anticipated demand for the redirection service 160. In other words, to ensure the ingestion rate for connection requests to the cluster is remains at an adequate level, the system may intelligently scale the number of resource units (e.g., pods) of the redirection service 160 to ensure the capacity of the resource units matches a workload requirement. For example, if the retrieved historical information indicates that during the current time period, the workload typically increases and/or auto-scaling has been initiated in the past, the system may proactively create (or deploy) additional resource units (e.g., pods) that provide the redirection service 160 to meet the anticipated increase in demand. As another example, if the number of current active connections is below a predetermined threshold, but the historical information indicates that the workload typically increases during such time period, the system may forego reducing the number of resource units, or even increase the number resource units, based on the predicted increase in the workload.

In 280, based on the determination in step 270, the system may scale the resource units to meet the current and/or anticipated workloads. For example, the system may create additional resource units, or reduce the number of resource units. When creating an additional resource unit, the additional resource unit may receive a connection request from another client.

It should be noted that although the auto-scaling of resource units described herein relates to a redirection service that operates as an entry point for clients to the cluster, it is to be understood that that the auto-scaling technique may be used for other types of components provided within various types of platforms as would be known to a person skilled in the art.

Figure 3:
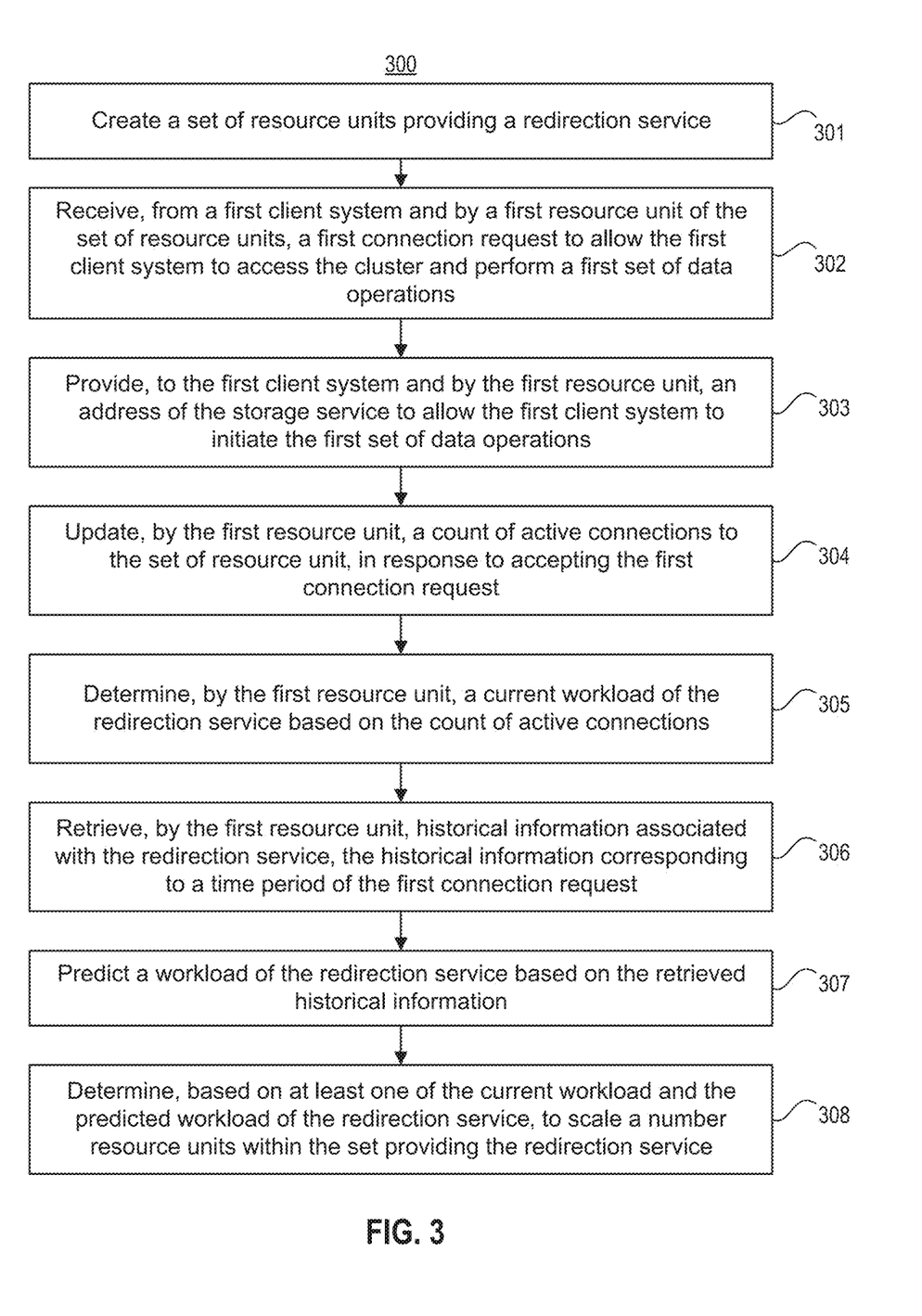
FIG. 3 is a flow diagram illustrating an example method of scaling a number of resource units providing a redirection system according to one or more embodiments of the disclosure.

FIG. 3 is a flow diagram illustrating an example method of scaling a number of resource units providing a redirection system according to one or more embodiments of the disclosure. Process 300 may use processing logic, which may include software, hardware, or a combination thereof. For example, process 300 may be performed by a system including one or more components described in operating environment 100.

In 301, the system may create a set of resource units (or pods) providing a redirection service. The redirection service may be configured to be an entry point to the cluster and redirect data operation requests to a storage service that manages data stored in an object storage. In some embodiments, the cluster is provided as part of a containerization platform, and each resource unit is a pod.

In 302, the system may receive, from a first client system and by a first resource unit of the set of resource units, a first connection request to allow the first client system to access the cluster and perform a first set of data operations.

In 303, the system may provide, to the first client system and by the first resource unit, an address of the storage service to allow the first client system to initiate the first set of data operations.

In 304, the system may update, by the first resource unit, a count of active connections to the set of resource units, in response to accepting the first connection request. In some embodiments, the count of active connections is cached in a memory of the first resource unit.

In 305, the system may determine, by the first resource unit, a current workload of the redirection service based on the count of active connections. In some embodiments, determining the current workload of the redirection service is further based on a resource utilization rate of one or more of the resource units.

In 306, the system retrieve, by the first resource unit, historical information associated with the redirection service, the historical information corresponding to a time period of the first connection request. In some embodiments, the historical information includes at least one of previous workloads of the redirection service, previous resource consumption of the set of resource units, and previous instances of scaling the number of resource units. In some embodiments, the historical information is cached in a memory of the first resource unit.

In 307, the system may predict a workload of the redirection service based on the retrieved historical information corresponding to the time period of the first connection request.

In 308, the system may determine, based on at least one of the current workload and the predicted workload of the redirection service, to scale a number resource units within the set providing the redirection service. For example, the scaling may include increasing or decreasing the number of resources units.

In some embodiments, the current workload of the redirection service is determined based on at least one of the count of active connections exceeding a threshold number, and the resource utilization rate of the one or more resource units exceeding a threshold utilization rate, Accordingly, in response, determining to scale the number resource units may include increasing the number of resource units within the set.

In some embodiments, predicting the workload of the redirection service based on the retrieved historical information includes predicting an increase in workload for the redirection service. Accordingly, in response, determining to scale the number resource units includes increasing the number of resource units within the set.

As described, different clients may connect with additional resource units. Accordingly, the system may also create a second resource unit to add to the set of resource units, in response to determining to scale the number resource units. The system may then receive, from a second client system and by the second resource unit, a second connection request to allow the second client system to access the cluster and perform a second set of data operations. The system may update, by the second resource unit, the count of active connections to the set of resource units, in response to accepting the second connection request. The system may also retrieve, by the second resource unit, historical information associated with the redirection service, the historical information corresponding to a time period of the second connection request. For example, the system may predict a decrease in workload for the redirection service based on the retrieved historical information corresponding to the time period of the second connection request. Accordingly, the system may determine to reduce the number resource units within the set of resource units providing the redirection service, in response to predicting the decrease in workload for the redirection service.

Figure 4:
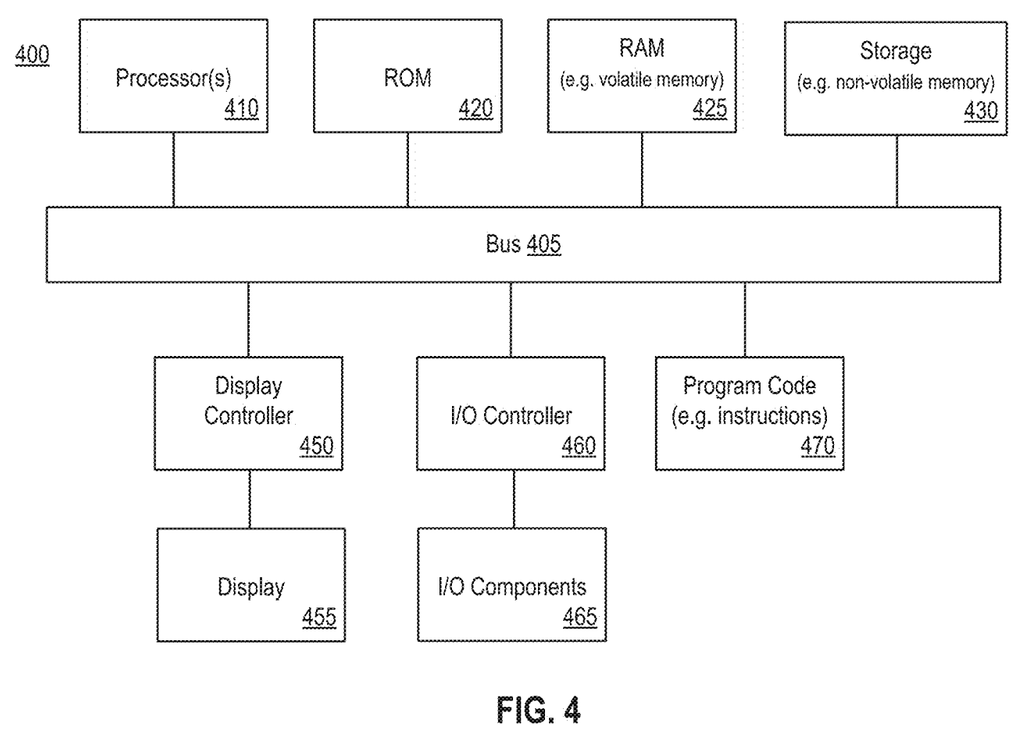
FIG. 4 is a block diagram illustrating an example computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g., systems 110, 150, 160, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g., within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g., within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g., accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g., redirection service 160, cluster 150, system 100, etc.). Program code 470 may reside, completely or at least partially, within the memories described herein (e.g., non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g., any noun in the application). The use of ordinal numbers does not necessarily imply or create any particular ordering of the elements nor limit any element to being only a single element unless expressly disclosed, such as by the use of the terms "before." "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g., and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system for providing data protection services within a computing cluster, comprising:
   one or more processors; and
   a non-transitory computer readable medium storing a plurality of instructions, which when executed, cause the one or more processors to:
   create a set of resource units as a proxy between client systems and a storage service, the set of resource units providing a redirection service configured to be an entry point to the computing cluster, receive data operation requests from the client systems, and redirect the data operation requests to a storage service within the computer cluster, the storage service manages data stored in an object storage connected to the computer cluster and performs data storage operations associated with the data operation requests;
   receive, from a first client system and by a first resource unit of the set of resource units, a first connection request to allow the first client system to access the cluster and perform a first set of data operations;
   provide, to the first client system and by the first resource unit, an address of the storage service to allow the first client system to initiate the first set of data operations;
   update, by the first resource unit, a count of active connections to the set of resource units, in response to accepting the first connection request;
   determine, by the first resource unit, a current workload of the redirection service based on the count of active connections;
   retrieve, by the first resource unit, historical information associated with the redirection service, the historical information corresponding to a time period of the first connection request;
   predict a workload of the redirection service based on the retrieved historical information corresponding to the time period of the first connection request; and
   determine, based on at least one of the current workload and the predicted workload of the redirection service, to scale a number resource units within the set providing the redirection service.

2. The system of claim 1, wherein determining the current workload of the redirection service is further based on a resource utilization rate of one or more of the resource units.

3. The system of claim 2, wherein:
   the current workload of the redirection service is determined based on at least one of the count of active connections exceeding a threshold number, and the resource utilization rate of the one or more resource units exceeding a threshold utilization rate; and
   determining to scale the number resource units includes increasing the number of resource units within the set.

4. The system of claim 1, wherein the historical information includes at least one of previous workloads of the redirection service, previous resource consumption of the set of resource units, and previous instances of scaling the number of resource units.

5. The system of claim 4, wherein:
   predicting the workload of the redirection service based on the retrieved historical information includes predicting an increase in workload for the redirection service; and
   determining to scale the number resource units includes increasing the number of resource units within the set.

6. The system of claim 1, wherein the plurality of instructions, when executed, further cause the one or more processors to:
   create a second resource unit to add to the set of resource units, in response to determining to scale the number resource units;
   receive, from a second client system and by the second resource unit, a second connection request to allow the second client system to access the cluster and perform a second set of data operations;
   update, by the second resource unit, the count of active connections to the set of resource units, in response to accepting the second connection request;

retrieve, by the second resource unit, historical information associated with the redirection service, the historical information corresponding to a time period of the second connection request;
predict a decrease in workload for the redirection service based on the retrieved historical information corresponding to the time period of the second connection request; and
determine to reduce the number resource units within the set of resource units providing the redirection service, in response to predicting the decrease in workload for the redirection service.

7. The system of claim 1, wherein the count of active connections is cached in a memory of the first resource unit.

8. The system of claim 1, wherein the historical information is cached in a memory of the first resource unit.

9. The system of claim 1, wherein the cluster is provided as part of a containerization platform, and each resource unit is a pod.

10. A method of providing data protection services within a computing cluster, comprising:
creating a set of resource units as a proxy between client systems and a storage service, the set of resource units providing a redirection service configured to be an entry point to the computing cluster, receive data operation requests from the client systems, and redirect the data operation requests to a storage service within the computer cluster, the storage service manages data stored in an object storage connected to the computer cluster and performs data storage operations associated with the data operation requests;
receiving, from a first client system and by a first resource unit of the set of resource units, a first connection request to allow the first client system to access the cluster and perform a first set of data operations;
providing, to the first client system and by the first resource unit, an address of the storage service to allow the first client system to initiate the first set of data operations;
updating, by the first resource unit, a count of active connections to the set of resource units, in response to accepting the first connection request;
determining, by the first resource unit, a current workload of the redirection service based on the count of active connections;
retrieving, by the first resource unit, historical information associated with the redirection service, the historical information corresponding to a time period of the first connection request;
predicting a workload of the redirection service based on the retrieved historical information corresponding to the time period of the first connection request; and
determining, based on at least one of the current workload and the predicted workload of the redirection service, to scale a number resource units within the set providing the redirection service.

11. The method of claim 9, wherein determining the current workload of the redirection service is further based on a resource utilization rate of one or more of the resource units.

12. The method of claim 11, wherein:
the current workload of the redirection service is determined based on at least one of the count of active connections exceeding a threshold number, and the resource utilization rate of the one or more resource units exceeding a threshold utilization rate; and
determining to scale the number resource units includes increasing the number of resource units within the set.

13. The method of claim 10, wherein the historical information includes at least one of previous workloads of the redirection service, previous resource consumption of the set of resource units, and previous instances of scaling the number of resource units.

14. The method of claim 13, wherein:
predicting the workload of the redirection service based on the retrieved historical information includes predicting an increase in workload for the redirection service; and
determining to scale the number resource units includes increasing the number of resource units within the set.

15. The method of claim 10, further comprising:
creating a second resource unit to add to the set of resource units, in response to determining to scale the number resource units;
receiving, from a second client system and by the second resource unit, a second connection request to allow the second client system to access the cluster and perform a second set of data operations;
updating, by the second resource unit, the count of active connections to the set of resource units, in response to accepting the second connection request;
retrieving, by the second resource unit, historical information associated with the redirection service, the historical information corresponding to a time period of the second connection request;
predicting a decrease in workload for the redirection service based on the retrieved historical information corresponding to the time period of the second connection request; and
determining to reduce the number resource units within the set of resource units providing the redirection service, in response to predicting the decrease in workload for the redirection service.

16. A computer program product comprising a non-transitory computer-readable medium having a computer-readable program code embodied therein to be executed by one or more processors, the program code including instructions to:
create a set of resource units as a proxy between client systems and a storage service, the set of resource units providing a redirection service configured to be an entry point to the computing cluster, receive data operation requests from the client systems, and redirect the data operation requests to a storage service within the computer cluster, the storage service manages data stored in an object storage connected to the computer cluster and performs data storage operations associated with the data operation requests;
receive, from a first client system and by a first resource unit of the set of resource units, a first connection request to allow the first client system to access the cluster and perform a first set of data operations;
provide, to the first client system and by the first resource unit, an address of the storage service to allow the first client system to initiate the first set of data operations;
update, by the first resource unit, a count of active connections to the set of resource units, in response to accepting the first connection request;
determine, by the first resource unit, a current workload of the redirection service based on the count of active connections;

retrieve, by the first resource unit, historical information associated with the redirection service, the historical information corresponding to a time period of the first connection request;

predict a workload of the redirection service based on the retrieved historical information corresponding to the time period of the first connection request; and determine, based on at least one of the current workload and the predicted workload of the redirection service, to scale a number resource units within the set providing the redirection service.

17. The computer program product of claim 16, wherein determining the current workload of the redirection service is further based on a resource utilization rate of one or more of the resource units.

18. The computer program product of claim 17, wherein:
the current workload of the redirection service is determined based on at least one of the count of active connections exceeding a threshold number, and the resource utilization rate of the one or more resource units exceeding a threshold utilization rate; and determining to scale the number resource units includes increasing the number of resource units within the set.

19. The computer program product of claim 16, wherein the historical information includes at least one of previous workloads of the redirection service, previous resource consumption of the set of resource units, and previous instances of scaling the number of resource units.

20. The computer program product of claim 19, wherein:
predicting the workload of the redirection service based on the retrieved historical information includes predicting an increase in workload for the redirection service; and determining to scale the number resource units includes increasing the number of resource units within the set.

* * * * *